United States Patent [19]

Sakamoto

[11] Patent Number: 5,276,562
[45] Date of Patent: Jan. 4, 1994

[54] EMPHASIS APPARATUS DISPOSED IN EITHER A RECORD OR PLAYBACK SYSTEM HAVING TRIPLE WEIGHT COEFFICIENT GENERATING DEVICES

[75] Inventor: Etsurou Sakamoto, Kanagawa, Japan

[73] Assignee: Sony Corporation, Tokyo, Japan

[21] Appl. No.: 851,909

[22] Filed: Mar. 16, 1992

[30] Foreign Application Priority Data

Mar. 29, 1991 [JP] Japan .................. 3-91513

[51] Int. Cl.⁵ .............................. H04N 5/78
[52] U.S. Cl. .................. 360/33.1; 358/315
[58] Field of Search .......... 360/29, 65, 32, 33.1, 360/10.3, 19.1; 358/315, 320, 327, 340, 310, 312, 328

[56] References Cited

U.S. PATENT DOCUMENTS

| | | | |
|---|---|---|---|
| 4,303,952 | 12/1981 | Yamamitsu et al. | 360/29 |
| 4,682,251 | 7/1987 | Hirota et al. | 360/33.1 |
| 4,789,906 | 12/1988 | Urata et al. | 360/33.1 |

FOREIGN PATENT DOCUMENTS

0466442A2  1/1992  European Pat. Off. .

OTHER PUBLICATIONS

IBA Experimental & Development Report 151/89 Sep. 1989, Crawley Court, Winchester, Hampshire B. Beech, C. Baudoin 'Compatible Non-Linear Pre-emphasis for MAC Signals' p. 1, right column, line 19–line 25; figure 1, p. 2, right column, line 25–p. 3, left column, line 1, p. 9, right column, line 12–p. 10, left column, line 6.

*Primary Examiner*—Edward P. Westin
*Assistant Examiner*—Que T. Le
*Attorney, Agent, or Firm*—William S. Frommer; Alvin Sinderbrand

[57] ABSTRACT

A compensating deemphasis circuit is connected to a preemphasis circuit in series. The deemphasis circuit has the same characteristic as a deemphasis circuit provided in a playback system. An input signal and an output signal which are connected in series are supplied to a subtracter. The subtracter extracts a distortion component. This distortion component is overlapped to an output signal of the preemphasis circuit through a weight coefficient generating device. When the signal passes through the deemphasis circuit in the record and playback system and that in the playback system, the distortion component is canceled.

5 Claims, 4 Drawing Sheets

EMPHASIS APPARATUS DISPOSED IN EITHER A RECORD OR PLAYBACK SYSTEM HAVING TRIPLE WEIGHT COEFFICIENT GENERATING DEVICES

BACKGROUND OF THE INVENTION

1. Field of the Invention

The present invention relates to an emphasis apparatus for use in a VTR for HDTV or the like.

2. Description of the Prior Art

For example, a conventional VTR is provided with a preemphasis circuit disposed on the record system, for emphasizing the high band of a recorded signal; a deemphasis circuit disposed on the playback system, for emphasizing the high band of the playbacked signal; and a deemphasis circuit disposed on the playback system, for deemphasizing the playbacked signal so as to prevent S/N ratio from decreasing in record and playback modes.

Figure 1:
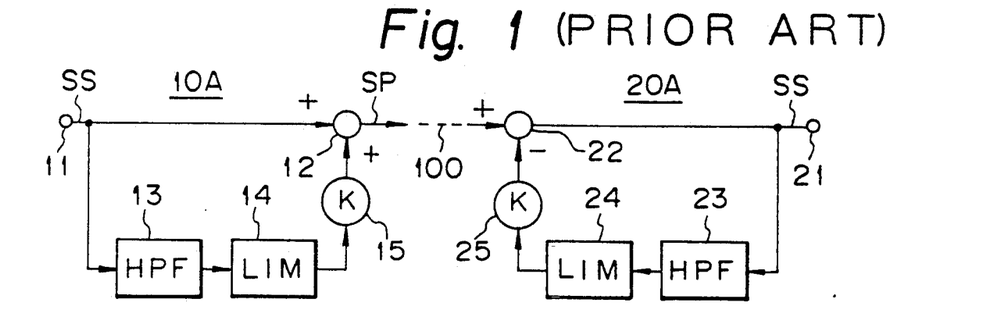
FIG. 1 is a block diagram of an example of a conventional emphasis apparatus.
Figure 2:
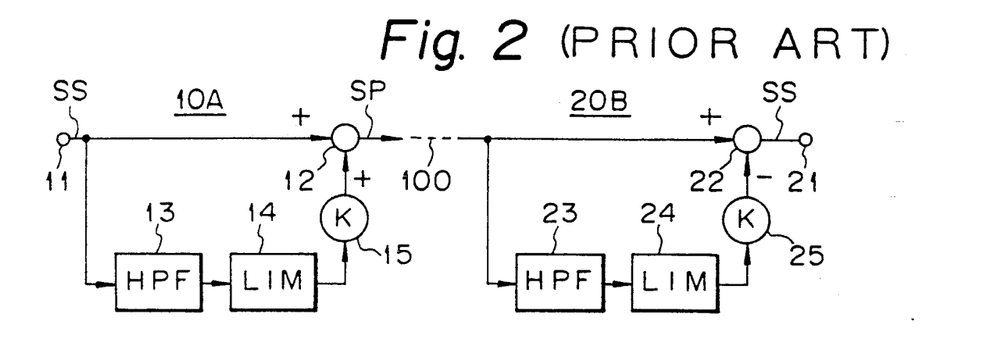
FIG. 2 is a block diagram of another example of a conventional emphasis apparatus.
Figure 3:
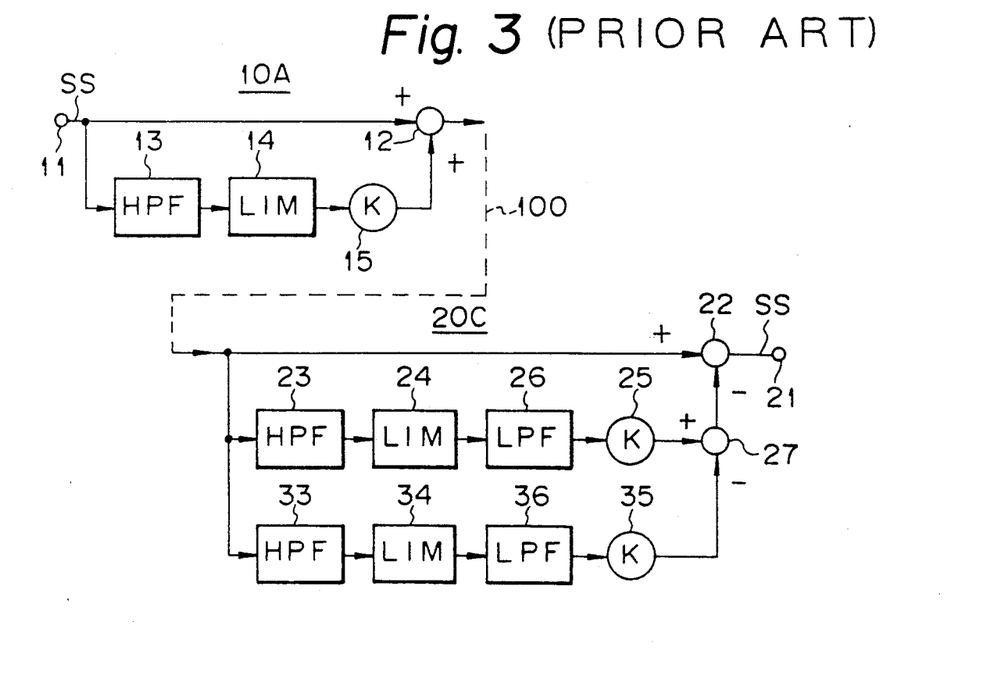
FIG. 3 is a block diagram of further another example of a conventional emphasis apparatus.

A nonlinear emphasis circuit for increasing the emphasizing amount proportional to the frequency of a signal or disproportional to the amplitude of a signal has been practically used. FIGS. 1, 2, and 3 show examples of conventional emphasis circuits. In FIG. 1, reference numeral 10A is a nonlinear preemphasis circuit disposed in a record system. In the circuit, a recorded signal SS such as a brightness signal is supplied from an input terminal 11 to an adder 12. In addition, the received signal SS is also supplied to a high-pass filter 13. The high-pass filter 13 extracts a high band component from the received signal SS. The high band component is supplied to the adder 12 through a nonlinear circuit, for example, a limiter 14, and a coefficient generating circuit 15. Thus, the adder 12 outputs a signal SP whose high band is emphasized or a preemphasized signal.

In this circuit, the limiter 14 limits the emphasizing amount of the high band component to, for example, at most 10 dB. The coefficient generating circuit 15 weights the high band component which is added to the main signal SS which is supplied to the adder 12. The preemphasized signal SP supplied from the adder 12 is supplied to a record and playback system 100 and then recorded or playbacked.

Reference numeral 20A is a nonlinear deemphasis circuit. The signal SP which is playbacked in the record and playback system 100 is supplied to a subtracter 22. An output signal of the subtracter 22 is obtained from an output terminal 21. This signal is also fed back to the subtracter 22 through a signal line which comprises a high-pass filter 23, a limiter 24, and a coefficient generating circuit 25. The circuits 23 to 25 have the same characteristics as the circuits 13 to 15 of the preemphasis circuit 10A, respectively. Thus, since the deemphasis circuit 20A has the reverse (compensating) characteristics of the preemphasis circuit 10A, the signal SS with a flat frequency characteristic is output from the output terminal 21.

Since the above mentioned deemphasis circuit 20A is constructed as a feed-back type, the reverse characteristic (reverse transfer function) in the high band cannot be correctly accomplished due to phase rotation therein.

To solve such a problem, a deemphasis circuit 20B in a feed-forward construction as shown in FIG. 2 has been proposed. In this deemphasis circuit 20B, since a playbacked signal SP passes through a signal line which comprises a high-pass filter 23, a limiter 24, and a coefficient generating circuit 25, the high band component is extracted. The extracted high band component is supplied to a subtracter 22. The subtracter 22 subtracts the high band component from the playbacked signal SP. Thereby, an original signal SS is obtained.

The deemphasis circuit 20B of the feed-forward type can more accurately accomplish the reverse characteristic than the deemphasis circuit 20A shown in FIG. 1. However, in the deemphasis circuit 20B, when the amplitude of the signal exceeds the limiter level of the limiter 24, the distortion of the signal becomes large.

A deemphasis circuit 20C shown in FIG. 3 is constructed so that such distortion is decreased. In this circuit, a signal line of high band component is provided with a low-pass filter 26. In addition, a distortion component Δ is formed by a high-pass filter 33, a limiter 34, a low-pass filter 36, and a coefficient generating circuit 35. A subtracter 27 subtracts the distortion component Δ from the high band component. Thereby, a high band component free of the distortion component Δ is obtained. This high band component is supplied to an subtracter 22 and thereby the original signal SS is obtained from a terminal 21. However, this deemphasis circuit 20C shown in FIG. 3 has three signal routes. Thus, the circuit construction is complicated and the adjustment thereof becomes difficult.

As described above, in the deemphasis circuit 20A as shown in FIG. 1, it is difficult to accomplish the reverse characteristic in the high band. In addition, in the deemphasis circuit 20B as shown in FIG. 2, when the amplitude of a playbacked signal is large, a distortion takes place. Moreover, in the deemphasis circuit 20C as shown in FIG. 3, the construction is complicated and the adjustment thereof becomes difficult.

OBJECTS AND SUMMARY OF THE INVENTION

Therefore, an object of the present invention is to provide emphasis apparatuses which are capable of solving such problems involved in the prior art.

According to an aspect of the invention, there is provided an emphasis apparatus disposed in a record system device for processing a record signal necessary for a playback process suitable for a playback system device, the playback system device having a deemphasis circuit for subtracting from a playback signal a signal which passes through a feed-forward route, the feed-forward route comprising a high-pass filter, a limiter, a weight coefficient generating device, the emphasis apparatus comprising, a preemphasis circuit for adding to an input signal a signal which passes through a feed-forward route, the feed-forward route comprising a high-pass filter, a limiter, and a weight coefficient generating device, a compensating deemphasis circuit for receiving an output signal of the preemphasis circuit, the compensating deemphasis circuit having nearly the same characteristic as that of the deemphasis circuit, circuit for extracting a distortion component from the input signal and an output signal of the compensating deemphasis circuit, and circuit for overlapping the extracted distortion component to an input signal as a compensation component through a coefficient generating device.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Before describing the circuits of the embodiment, the basic construction of the invention is discussed with reference to FIGS. 4 and 5.

Figure 4:
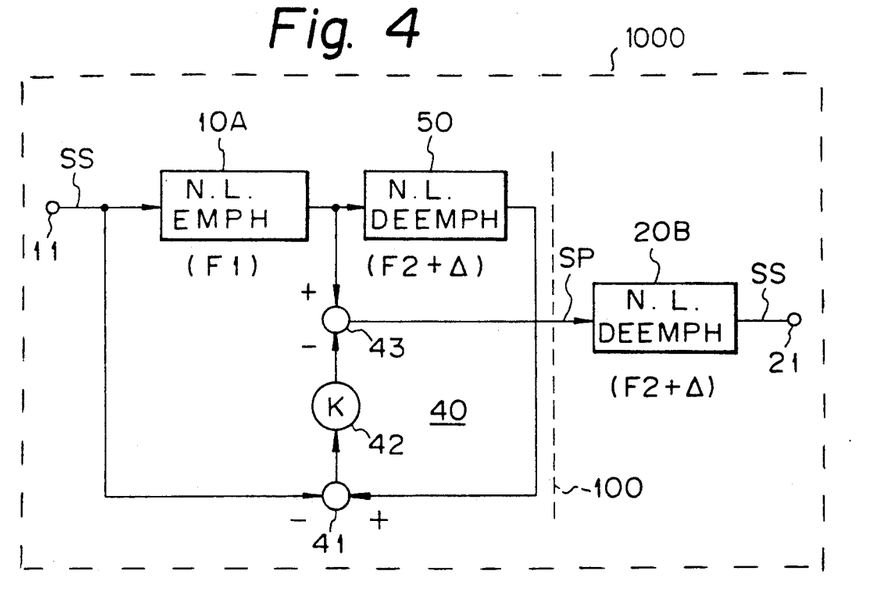
FIG. 4 is a block diagram showing a basic construction for performing compensation on a preemphasis side in accordance with the present invention.

FIG. 4 shows a basic construction of a preemphasis circuit provided in a record system of an image signal processing device 1000, such as a VCR (video cassette recorder) or a VTR, the preemphasis circuit compensating a distortion. An input signal SS is supplied to an input terminal 11. The input terminal 11 is connected to an nonlinear emphasis circuit 10A. The nonlinear emphasis circuit 10A is connected to a compensating nonlinear deemphasis circuit 50 in series. The deemphasis circuit 50 subtracts from an input signal an output signal of a feed-forward circuit which comprises a high-pass filter, a limiter, and a coefficient generating circuit like a deemphasis circuit 20B provided in a playback system. The deemphasis characteristic of the circuit 20B is the same as that of the circuit 50.

The input terminal 11, the output terminal of the preemphasis circuit 10A, and the output terminal of the deemphasis circuit 50 are connected to a distortion compensating circuit 40 for extracting a distortion component and overlapping the distortion component to an input signal. The distortion compensating circuit 40 comprises a subtracter 41, a coefficient generating circuit 42, and a subtracter 43.

The subtracter 41 subtracts an input signal SS from an output signal of the deemphasis circuit 50. The subtracter 41 extracts and outputs the distortion component. An output signal of the subtracter 41 is supplied to the subtracter 43 through the coefficient generating circuit 42. The subtracter 43 subtracts an output signal of the coefficient generating circuit 42 from an output signal of the preemphasis circuit 10A and obtains an output signal SP. The output signal SP is supplied to a playback system through a record and playback system 100 shown by a dashed line. The signal SP is sent to an output terminal 21 through a deemphasis circuit 20B. The record and playback system 100 comprises a circuit system including an FM modulation circuit, an FM demodulation circuit, and so forth and an electromagnetic conversion system including a rotation head, a magnetic tape, and so forth.

Then, a distortion decreasing operation in the construction as shown in FIG. 4 is described. In the following description, these symbols are used.

F1: Transfer function of preemphasis circuit 10A

F2: Ideal transfer function of deemphasis circuits 20B and 50

F2+Δ: Real transfer function of deemphasis circuits 20B and 50

Δ: Distortion component where F1×F2=1

Since the total transfer characteristic G1 of the preemphasis circuit 10A and the deemphasis circuit 50 is given by the following equation $$G1 = F1\,(F2+\Delta),$$

the transfer characteristic G2 from the input terminal 11 to the subtracter 41 is given by the following equation.

$$G2 = G1 - 1 = F1\,(F2+\Delta) - 1$$

Thus, the transfer characteristic G3 from the input terminal 11 to the subtracter 43 is given by the following equation.

$$G3 = F1 - KG2 = F1 - K\{F1\,(F2+\Delta) - 1\}$$

In addition, in the record mode or the playback mode, since the characteristic of the deemphasis circuit 20B in the playback system is added, the transfer characteristic from the input terminal 11 to the output terminal 21, or the total transfer characteristic G in the record mode or the playback mode is given by the following equation.

$$G = G3\,(F2+\Delta) = [F1 - K\{F1\,(F2+\Delta)-1\}] \times (F2+\Delta) = 1 - (K-F1)\Delta - F1K1\Delta^2 \approx 1 - (K-F1)\Delta$$

Thus, when the transfer function F1 obtains a gain ranging from 1 to (1 K1) in accordance with the amplitude of the input signal SS, if the amplitude of the input signal SS is large, F1 is approximately 1. Thus, when K is 1, G becomes 1. Consequently, when the amplitude of the input signal SS is large, the distortion component Δ can be removed. In addition, when the distortion component Δ becomes maximum with a particular amplitude, if a coefficient K is set to the gain of the transfer function F1 in accordance with the amplitude is set, the distortion component Δ can be effectively removed.

When the distortion which takes place is smaller than the limiter level, if the relation of (K=F1') is satisfied in the above equation, the distortion nearly becomes 0. The transfer function F1' is the same as the linear characteristic of the emphasis circuit 10A. The linear characteristic of the emphasis circuit 10A takes place when the amplitude of the input signal SS is small. For example, the transfer function F1' is given by the following equation.

$$F1' = 1 + K1\,\{s\tau 1/(1+s\tau 1)\}$$

Figure 5:
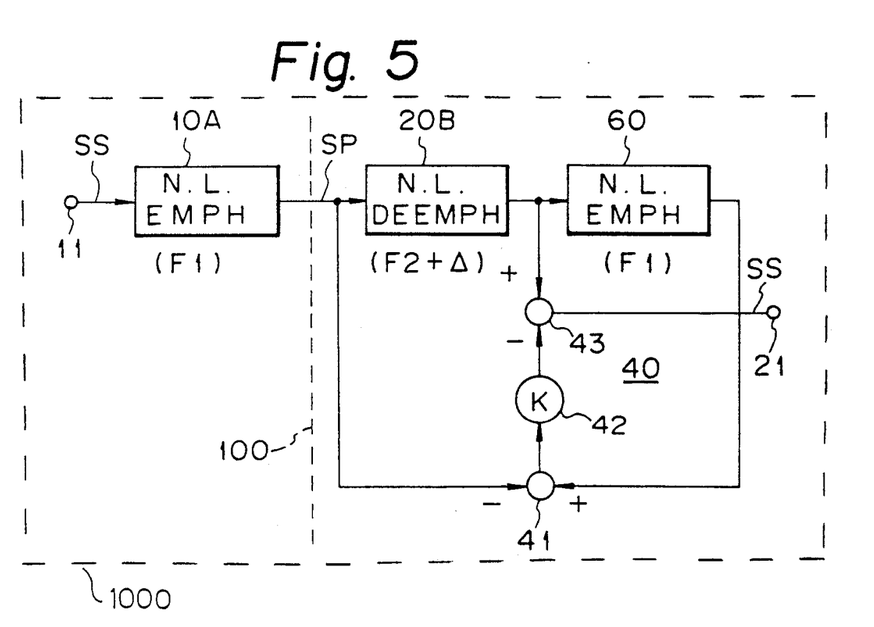
FIG. 5 is a block diagram showing a basic construction for performing compensation on a deemphasis side in accordance with the present invention.

Then, with reference to FIG. 5, a compensation performed on the deemphasis side of the image processing device 1000 is described. A record and playback system 100 supplies a signal SP to a nonlinear deemphasis circuit 20B. The nonlinear deemphasis circuit 20B is connected to a compensating nonlinear emphasis circuit 60 in series. The preemphasis circuit 60 adds to an input signal an output signal of a feed-forward circuit which comprises a high-pass filter, a limiter, and a coefficient circuit like the preemphasis circuit 10A on the record system. The preemphasis characteristic of the circuit 10A is the same as that of the circuit 60. An input terminal for supplying the signal SP, an output terminal of the deemphasis circuit 20B, and an output terminal of the preemphasis circuit 60 are connected to a compensation circuit 40 which comprises a subtracter 41, a coefficient generating circuit 42, and a subtracter 43 like the construction shown in FIG. 4.

Then, a distortion decreasing operation in the construction shown in FIG. 5 is described. The total transfer characteristic G10 of the deemphasis circuit 20B and the preemphasis circuit 60 is given by the following equation.

$$G10 = (F2+\Delta) F1$$

Thus, the transfer characteristic G20 from the record and playback system 100 to a subtracter 41 is given by the following equation.

$$G20 = G10-1 = (F2+\Delta) F1 - 1$$

Thus, the transfer characteristic G30 from an input terminal of the playbacked signal to an output terminal 21 is given by the following equation.

$$G30 = F2 + \Delta - KG20 = F2 + \Delta - K\{(F2+\Delta) F1 - 1\} = F2 + \Delta$$

$$(1 - KF1) \text{ (where } 0 < K \leq 1)$$

Thus, when the transfer function F1 of the preemphasis circuit 60 has a gain ranging from 1 to $(1+K1)$ in accordance with the amplitude of the input signal SS, if K ranges from $1/(1+K1)$ to 1, then $1-KF1$ becomes 0. Thus, G30 becomes F2. In other words, the transfer characteristic G30 of the deemphasis apparatus in the playback system becomes the ideal characteristic F2. Thus, when the distortion $\Delta$ becomes maximum at a particular amplitude, by setting a coefficient K to the gain of the transfer function F1 in accordance with the amplitude, the distortion $\Delta$ can be effectively removed.

When the distortion $\Delta$ is smaller than the limiter level, if the relation of (K=F2) or (K=F2') is satisfied in the above equation, the distortion of the output signal SS nearly becomes 0. The transfer function F2' is the same as the linear characteristic of the deemphasis circuit 20B. The linear characteristic of the deemphasis circuit 20B takes place when the amplitude of the input signal SP is small.

Figure 6:
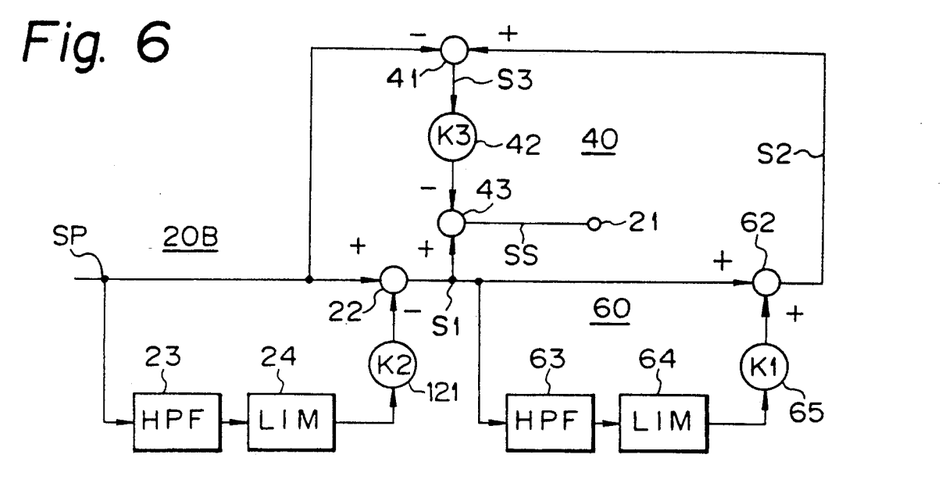
FIG. 6 is a block diagram of a first embodiment in accordance with the present invention.

FIG. 6 shows an embodiment of a distortion decreasing system on a playback side as shown in FIG. 5. A deemphasis circuit 20B is provided with a subtracter 22 for subtracting from an input signal (playbacked signal) SP a signal which passes through a circuit system which comprises a high-pass filter 23, a limiter 24, and a coefficient generating device 121. A compensating preemphasis circuit 60 is provided with an adder 62 for adding to an output signal of the deemphasis circuit 20B a signal which passes through a circuit system which comprises a high-pass filter 63, a limiter 64, and a coefficient generating device 65. This preemphasis circuit 60 has the same characteristic as that on the record side.

A signal obtained from the serial connection of the deemphasis circuit 20B and the preemphasis circuit 60 and an input signal SP are supplied to a subtracter 41 of a distortion compensating circuit 40. The subtracter 41 outputs a preestimated distortion component. The distortion component is supplied to a subtracter 43 through a coefficient generating device 42. Thus, the distortion component of the signal SP is canceled.

When coefficients of coefficient generating devices 65, 121 and 42 are K1, K2, and K3; a transfer function of a high band deemphasizing circuit system comprising a high-pass filter 23 and a limiter 24 of deemphasis circuit 20B, and a coefficient circuit 121 is $(F2^*+\Delta)$; a transfer function of a high band emphasizing circuit system comprising a high-pass filter 63 and a limiter 64 of preemphasis circuit 60 and a coefficient circuit 65 is $F1^*$; then the output signal S1 of the deemphasis circuit 20B is given by the following equation.

$$S1 = (1-F2^*-\Delta) SP$$

The output signal S2 of the preemphasis circuit 60 is given by the following equation.

$$S2 = (1-F2^*-\Delta)(1+F1^*) SP$$

The output signal S3 of the subtracter 41 is given by the following equation.

$$S3 = (1-F2^*)(1+F1^*) SP - \Delta(1+F1^*) SP$$
$$\approx SP - \Delta(1+F1^*) SP$$

In the above approximation, it is assumed that the following relation is satisfied.

$$(1-F2^*)(1+F1^*) \approx 1$$

Thus, the output signal SS is given by the following equation.

$$SS = S3 - SP = (1-F2^*) SP - \Delta\{1-(1+F1^*) K3\} SP$$

When $K3 = 1/(1+F1^*)$, the distortion becomes 0. Since the transfer function F1* varies in accordance with the signal level, the coefficient K3 is set when the distortion is maximum or in accordance with the signal level with the maximum improvement factor of distortion. In addition, when the function F1* in the case of small amplitude is used for $K3 = 1/(1+F1^*)$, a distortion which is smaller than the limiter level can be removed.

Moreover, as shown in the following, an edge noise of the signals can be removed. In other words, since the high-pass filter 23 of the deemphasis circuit 20B and the high-pass filter 63 of the preemphasis circuit 60 have compensating characteristics of each other, the following equation is given.

$$(1-H2K2)(1+H1K1) = 1$$

where H2 is a transfer characteristic of the high-pass filter 23; and H1 is a transfer characteristic of the high-pass filter 63.

When the signal frequency is within the passing band of the filters 23 and 63 and the amplitude is small, since H2=1 and H1=1, the following relation is satisfied.

$$(1-K2)(1+K1)=1$$

Thus, the following equation is obtained.

$$K2=K1/(1+K1) \quad (1)$$

The above equation can be transformed as follows.

$$(1-H2K2)(1+H1K1)=1$$

$$(1-H2K2)=1/(1+H1K1)$$

$$(H2K2=H1\ K1/(1+H1K1)$$

When the equation (1) is substituted into the above equation, the following equation is obtained.

$$H2=(1K1)\ H1/(1+H1K1)$$

For example, by using $H1=s*21/(1+s*21)$, where $1/\tau 1$ is a cut-off frequency, the following equation is obtained.

$$H2=s\tau 1\ (1+K1)/\{1+s\tau 1(1+K1)\}$$

In other words, the cut-off frequency of the high-pass filter 23 becomes $1/(1+K1)$ times the cut-off frequency of the high-pass filter 63. For example, when $K1=1.5$, the cut-off frequency of the high-pass filter 23 becomes 1/2.5 times the cut-off frequency of the high-pass filter 63. The high pass filters 23 and 63 can be constructed of FIR type or IIR type.

When the characteristics of the limiters 24 and 64 are defined with output signals in accordance with input signals; L2 is a characteristic of the limiter 24; L1 is a characteristic of the limiter 64; V2 is an input voltage of the deemphasis circuit 20B; and V1 is an input voltage of the preemphasis circuit, since V2 is an output voltage of the circuits 10A and 60 and V1 is an output voltage of the circuit 20B, then the following equations are obtained in the passing bands of the high pass filters 23 and 63.

$$(1-L2K2)\ V2=V1$$

$$(1+L1K1)\ V1=V2$$

Thus, with the above two equations, the following equation is obtained.

$$L2K2=L1K1/(1+L1K1)$$

By substituting the equation (1) into the above equation, the following equation is obtained.

$$L2=(1+K1)\ L1/(1+L1K1)$$

Figure 7:
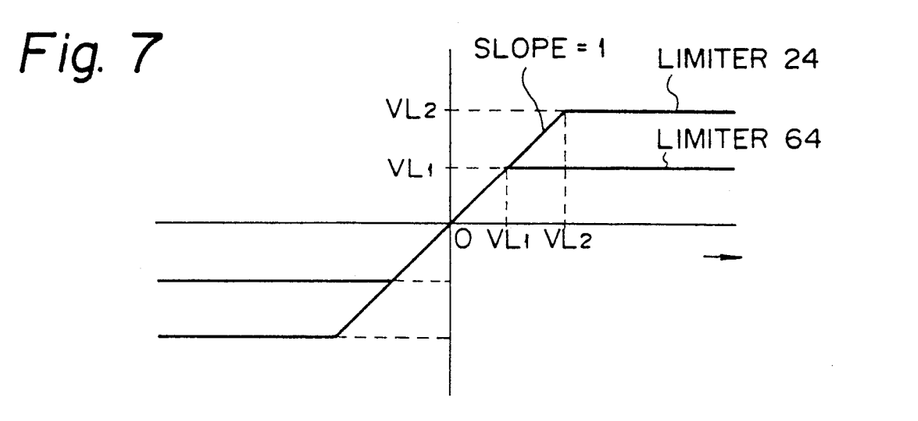
FIG. 7 is a schematic diagram describing a characteristic of a limiter for use in the first embodiment in accordance with the present invention.

Thus, as shown in FIG. 7, the limiter level VL2 of the limiter 24 is higher than the limiter level VL1 of the limiter 64.

Figure 8:
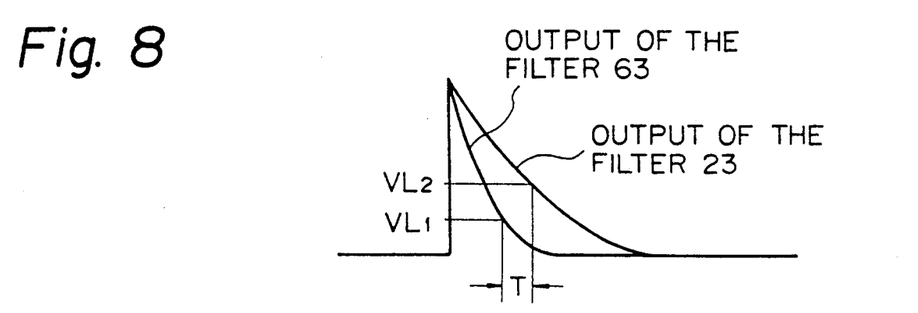
FIG. 8 is a schematic diagram describing a characteristic of an operation for decreasing edge noise for use in the first embodiment in accordance with the present invention.

Since the cut-off frequencies and the limiter levels VL2 and VL1 of the high pass filters 23 and 63 respectively satisfy the above relations, when the signal SP from the record and playback system 100 has a step waveform, the waveforms of the output signals of the high pass filters 23 and 63 and the limiter levels thereof are those shown in FIGS. 8 and 7, respectively.

When a noise (an edge noise) N in a period T is considered, a noise N60 of the output signal S2 of the preemphasis circuit 60 is given by the following equation.

$$N60=(1+K1)\ N$$

Thus, a noise N41 of the output signal S3 of the subtracter 41 is given by the following equation.

$$N41=N60-N=K1N$$

Thus, a noise N21 which is output to the output terminal 21 is given by the following equation.

$$N21=N-K3N41=N-K3K1N=N(1-K3K1)$$

When the relation of $1-K3K1=1-K2$ is satisfied, the noise level becomes equal to the flat portion of the waveform. Thus, the following equation is given.

$$K3=K2/K1$$

By substituting the equation (1) into the above equation, the following equation is obtained.

$$K3=1/(1+k1)$$

In other words, when the coefficients K3, K1, and (K2) are selected so that the above equations are satisfied, the edge noise can be decreased. In addition, the distortion $\Delta$ in the condition of $K3=1/(1+K1)$ is decreased to at least $K2\Delta$. When $F1=K1s\tau 1/(1+s\tau 1)$ is satisfied, the coefficient K3 is given by the following equation.

$$K3=1/(1+K1)\ \{s\tau 1/(1+s\tau 1)\}$$

Figure 9:
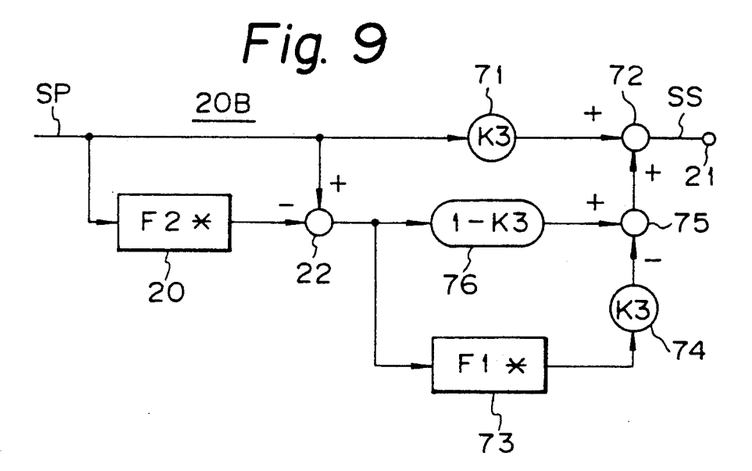
FIG. 9 is a block diagram of a second embodiment in accordance with the present invention.

FIG. 9 shows another circuit example for decreasing distortion of a deemphasis circuit in a playback system. A record and playback system 100 supplies a signal SP to a deemphasis circuit 20B. The deemphasis circuit 20B deemphasizes the signal SP and then supplies the resultant signal to a subtracter 22. Thereafter, the subtracter 22 outputs the deemphasized signal. In addition, the record and playback system 100 supplies the signal SP to an adder 72 through a coefficient generating circuit 71 having a coefficient of K3. In the FIGURE, reference numeral 20 is a circuit block which comprises a high-pass filter 23, a limiter 24, and a coefficient generating device 121. The circuit block 20 has a transfer function F2*.

The subtracter 22 supplies a signal to an adder 72 through a circuit block 73, a coefficient generating circuit 74, and a subtracter 75. The circuit block 73 comprises a high-pass filter 63, a limiter 64, and a coefficient generating device 65 and has a transfer function F1*. In this case, the coefficient of the coefficient generating circuit 74 is K3. Since the signal from the subtracter 22 is deemphasized, the frequency characteristic thereof is flat. Thus, the circuit block 73 extracts a high band component of the signal.

The subtracter 75 inverts the phase of the high band component and supplies the resultant signal to the adder 72. The adder 72 subtracts from the signal SP of the record and playback system 100 the high band component supplied from the circuit block 73. The adder 72 extracts the signal SS with flat frequency characteristic, or deemphasized signal. At the time, the coefficient generating circuit 76 multiplies the signal from the subtracter 22 by $(1-K3)$. Thereafter, the resultant signal is supplied to the adder 72 through the subtracter 75. Thus, the level of the signal SS from the adder 72 is compensated in accordance with the coefficient K3 of the coefficient generating circuits 71 and 74.

Figure 10:
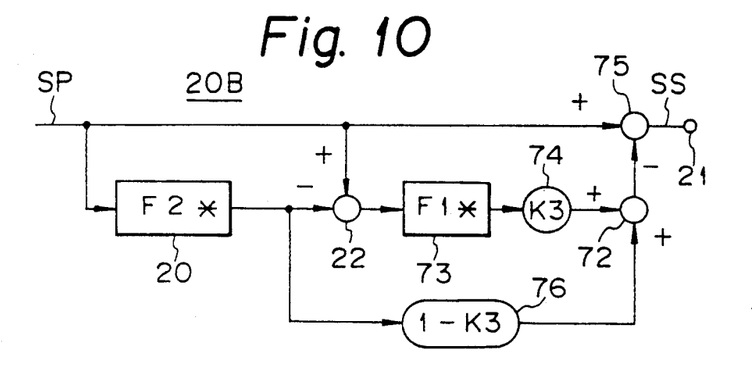
FIG. 10 is a block diagram of a third embodiment in accordance with the present invention.

FIG. 10 shows another example of the present invention. A record and playback system 100 outputs a signal SP to a deemphasis circuit 20B. The deemphasis circuit 20B supplies the resultant signal to a subtracter 22. The subtracter 22 outputs the deemphasized signal. In addition, the record and playback system 100 supplies the signal SP to a subtracter 75. The subtracter 22 supplies the resultant signal to the subtracter 75 through a circuit block 73, a coefficient generating circuit 74, and an adder 72. Since the signal from the subtracter 22 is deemphasized, the frequency characteristic thereof is flat. Thus, the circuit block 73 extracts a high band component of the signal. The subtracter 75 subtracts from the signal SP of the record and playback system 100 the high band component of the circuit block 73. Thus, the subtracter 75 outputs a signal SS with a flat frequency characteristic, or a deemphasized signal SS. In addition, the circuit block 20 outputs the high band component to the subtracter 75 through a coefficient generating circuit 76 having a coefficient of (1−K3) and the adder 72. Thus, the level of the high band component is compensated in accordance with the coefficient K3 of the coefficient generating circuit 74.

Figure 11:
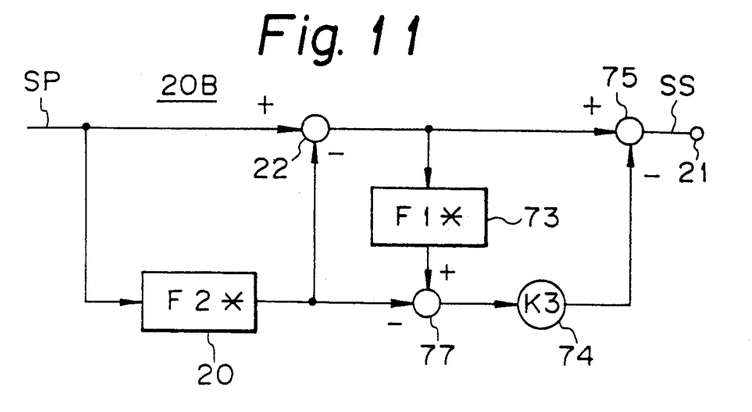
FIG. 11 is a block diagram of a fourth embodiment in accordance with the present invention.

FIG. 11 shows another circuit construction according to the present invention. A record and playback system 100 supplies a signal SP to a deemphasis circuit 20B. The deemphasis circuit 20B supplies the resultant signal to a subtracter 22. The subtracter 22 supplies the deemphasized signal to a circuit block 73 and a subtracter 75. A subtracter 77 subtracts from an output signal of the circuit block 73 an output signal of the circuit block 20. The subtracter 77 supplies the resultant signal to the subtracter 75 through a coefficient generating device having a coefficient of K3. The subtracter 75 subtracts from the output signal of the subtracter 22 an output signal of the coefficient generating device 74. The subtracter 75 supplies an output signal SS.

In the circuit examples shown in FIGS. 6, 9, 10, and 11, distortion is decreased in their playback systems like the example shown in FIG. 5. As shown in FIG. 4, according to the present invention, a compensation can be performed in a preemphasis circuit in a record system. In this case, in the circuits described above, F2 is substituted into −F1 and F1 into −F2.

As described above, according to the present invention, a distortion component which takes place in preemphasis process or deemphasis process are overlapped to preemphasized output signal. Thus, in deemphasis stage, this distortion component can be offset and removed. In addition, when the deemphasis apparatus is provided with a circuit for extracting a distortion component and offsetting and removing the distortion component from the deemphasized output signal, a deemphasized output signal free of distortion can be obtained.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An emphasis apparatus disposed in a record system device for processing an input signal so as to form a preemphasized signal suitable for subsequent processing by a playback system device having a non-linear deemphasis circuit for passing said preemphasized signal through a feed-forward route having a first high-pass filter, a first limiter, and a first weight coefficient generating device and for subtracting an output signal therefrom from said preemphasized signal so as to impose a predetermined characteristic upon said preemphasized signal, said emphasis apparatus comprising:

non-linear preemphasis means receiving said input signal for passing the received signal through a feed-forward route having a second high-pass filter, a second limiter, and a second weight coefficient generating device and for adding an output signal therefrom to said received signal;

compensating non-linear deemphasis means for receiving an output signal of said non-linear preemphasis means and for imposing thereon a predetermined characteristic similar to that imposed by said deemphasis circuit of said playback system device;

means receiving said input signal and an output signal of said compensating non-linear deemphasis means for extracting a distortion component therefrom; and means including a third weight coefficient generating device for receiving the extracted distortion component for overlapping an output signal from said third weight coefficient generating device with said output signal of said non-linear preemphasis means so as to form said preemphasized signal.

2. An emphasis apparatus disposed in a playback system device for processing a received preemphasized signal which is supplied from a record system device having a non-linear preemphasis circuit of the type which passes an input signal through a feed-forward route having a first high-pass filter, a first limiter, a first weight coefficient generating device and which adds an output signal therefrom to said input signal so as to form said preemphasized signal having an imposed predetermined characteristic, said emphasis apparatus comprising:

non-linear deemphasis means receiving said preemphasized signal for supplying the received preemphasized signal through a feed-forward route having a second high-pass filter, a second limiter, and a second weight coefficient generating device and for adding an output signal therefrom to said received preemphasized signal;

compensating non-linear preemphasis means for receiving an output signal of said non-linear deemphasis means and for imposing thereon a predetermined characteristic similar to that imposed by said non-linear preemphasis circuit of said record system device;

means receiving said received preemphasized signal and an output signal of said compensating non-linear preemphasis means for extracting a distortion component therefrom; and means including a third weight coefficient generating device for receiving the extracted distortion component for overlapping an output signal from said third weight coefficient generating device with said output signal of said non-linear deemphasis means.

3. The emphasis apparatus as set forth in claim 1 or 2, wherein said emphasis apparatus is included in an image signal processing device.

4. The emphasis apparatus as set forth in claim 3, wherein said image signal processing device is a VCR (video cassette recorder).

5. The emphasis apparatus as set forth in claim 4, wherein said VCR is arranged to process a high definition television signal.

* * * * *